(No Model.)
N. E. WEISELL.
FARM GATE.
No. 302,805. Patented July 29, 1884.
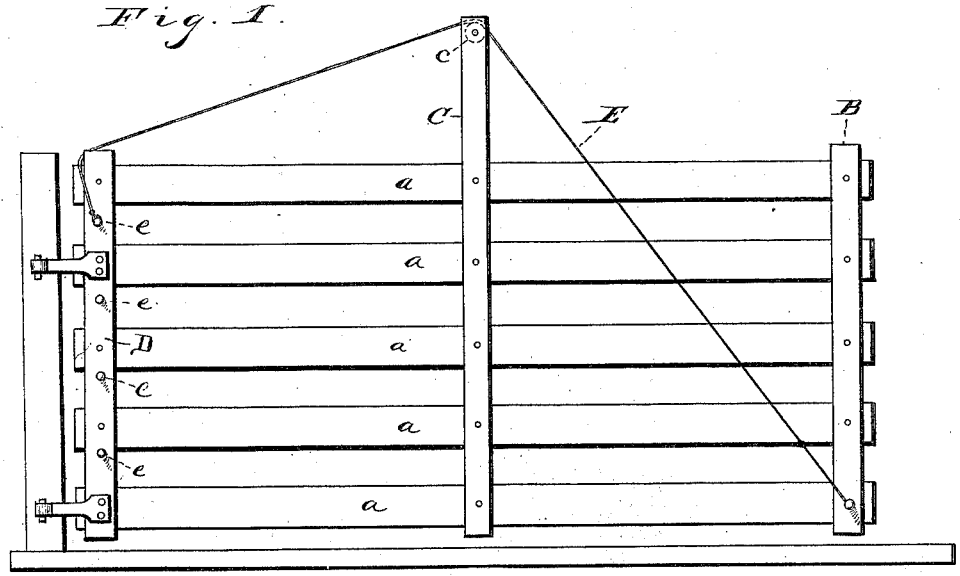
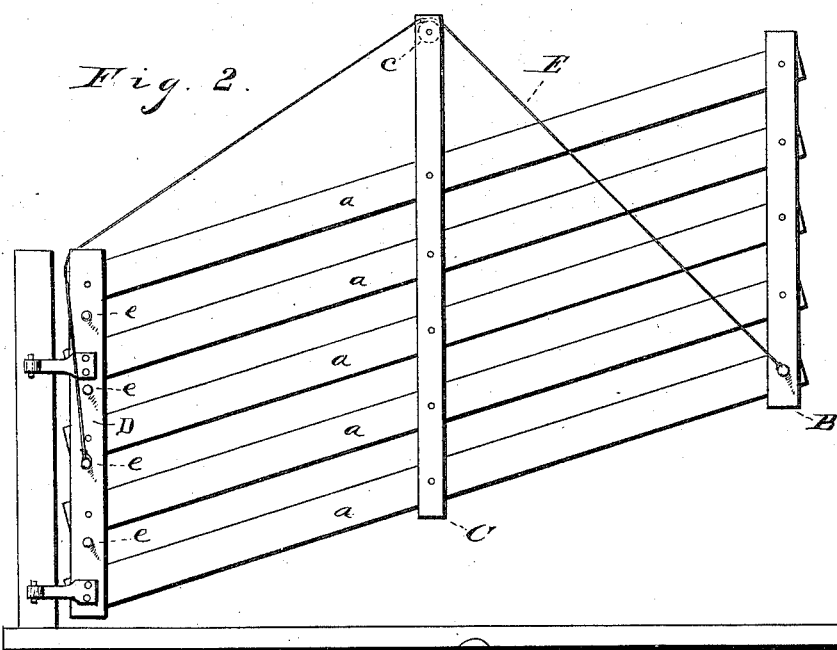
WITNESSES
W. Engel
Geo. W. King
Nelson E. Weisell
INVENTOR
By Leggett & Leggett
ATTORNEYS

UNITED STATES PATENT OFFICE.

NELSON E. WEISELL, OF LORDSTOWN, OHIO.

FARM-GATE.

SPECIFICATION forming part of Letters Patent No. 302,805, dated July 29, 1884.

Application filed November 24, 1883. (No model.)

*To all whom it may concern:*

Be it known that I, NELSON E. WEISELL, of Lordstown, in the county of Trumbull and State of Ohio, have invented certain new and useful Improvements in Farm-Gates; and I do hereby declare the following to be a full, clear, and exact description of the invention, such as will enable others skilled in the art to which it pertains to make and use the same.

My invention relates to improvements in farm-gates; and it consists in certain features of construction, and in the combination of parts hereinafter described, and pointed out in the claims.

In the drawings, Figure 1 is a side elevation of my improved gate in its ordinary position. Fig. 2 is a side elevation of the same, but with one end elevated.

The gate is made with the bars $a$, embraced by the three pairs of uprights B, C, and D. The parts are secured by a single pin, bolt, or rivet at each crossing of the said uprights and bars, as shown. The gate may be supported by any suitable hinges attached to the part D. The part C extends some distance above the other parts of the gate, and may be provided at the top with a roller, $c$, (shown in dotted lines.)

E is a flexible truss or brace secured to the bottom part of upright B, and passing over the pulley $c$ and over the top of the part D, and is attached, by means of a loop on the end thereof, to one of the pegs $e$. This brace may be a wire, rod, chain, thin metal strip, or, in fact, almost anything that is sufficiently strong and flexible and that will bear the exposure to the weather. The length of the brace is such that when it is attached to the upper peg, $e$, the gate will be in about a horizontal position. By attaching the brace to the next lower peg the right hand of the gate may be raised a short distance to admit of the passage of small animals; or, if deep snows or other obstructions occur, by attaching the brace to the lower pegs the gate may be raised to any desired position. This gate may be made light, strong, and easily adjustable, and will not sag and get out of order like the ordinary farm-gates.

What I claim is—

1. The combination, with the uprights B, C, and D, and bars pivotally secured to said uprights, of a truss or brace secured at one end to the upright B, and passing over a pulley or guide in the central upright, and adjustably secured at its opposite end to the upright D.

2. The combination, with the uprights B and D, the central upright, C, of greater length than the uprights B D, and provided at its upper end with a pulley, and the bars pivotally secured to said uprights, of a flexible truss or brace secured to the upright B and passing over the pulley C, and adjustably secured at its opposite end to the upright D.

In testimony whereof I sign this specification, in the presence of two witnesses, this 19th day of November, 1883.

NELSON E. WEISELL.

Witnesses:
 CHAS. H. DORER,
 ALBERT E. LYNCH.